Patented Sept. 18, 1928.

1,684,686

UNITED STATES PATENT OFFICE.

ELMER H. RECORDS, OF SPOKANE, WASHINGTON.

AQUEOUS LIQUID FUEL.

No Drawing.    Application filed January 6, 1925.    Serial No. 879.

The present invention relates to an improved aqueous liquid fuel involving the use of alcohol as a base or carrier and which may be used either per se as a motive fluid or source of power in an internal combustion engine as a substitute for gasoline, or the mixture may be blended with a quantity of gasoline for producing a highly combustible and powerful motive fluid.

As a fuel per se the aqueous-alcoholic liquid solution is especially adapted for use in internal combustion engines of tractor machines, trucks, stationary engines, and similar motors where heavy duty work is required.

By the use of an aqueous content in the fuel I have found that steam is generated in the cylinder of the motor to enhance the power of the explosion, thus increasing the efficiency of the motor or engine, and at the same time the cost of the fuel is reduced materially. The presence of the generated steam in the cylinder also affords a cushion for strokes of the piston of the engine so that the driving action of the piston of the internal combustion engine partakes of the more advantageous characteristics of the use of steam in steam engines.

I therefore find the addition of water to the liquid fuel blended with the alcoholic base in predetermined and proportioned quantities, produces excellent results in the combustion of the fuel.

To neutralize or eliminate the rust producing action of water in the tanks, pipes and other connections of the fuel feeding system, I utilize an anti-rust agency, such as an alkaline agency or solution in the liquid fuel, which agency may be sodium hydroxide.

In addition to its excellent results as a liquid fuel per se I find that when the solution according to my formula is added to a required amount or quantity of gasoline, the ingredients are chemically blended, and a more powerful motive fluid than gasoline per se is produced. By thus blending my mixture or solution with gasoline I have found that the formation of carbon monoxide gas, usually accompanying the combustion of gasoline per se, is prevented, rendering the blended fuel free from the dangers inherent in the use of gasoline and some other fuels.

For example a liquid fuel made according to my invention may comprise—

|                    | Per cent. |
|--------------------|-----------|
| Alcohol and water  | 72        |
| Benzol             | 18        |
| Ethyl ether        | 5         |
| Naphthalene        | 2.50      |
| Oxygen             | 1.50      |
| Sodium hydroxide   | 1.00      |

These ingredients are blended in a suitable manner to produce a non-stratifying, stable, and highly combustible liquid fuel which is maintained in a non-separable state and ready at all times for use in the standard carbureting systems of internal combustion engines for various purposes. Such a liquid fuel possesses an exceedingly high explosive power at a comparatively lower temperature than usually accompanies the combustion of gasoline or other similar liquid fuels.

The employment of the fuel in the cylinders of an engine assists in destroying carbon deposits therein and prevents subsequent accumulation of such deposits in the engine and related parts.

As a base for the mixture I utilize alcohol of any proof, and use a water content to a selected and adequate degree. Low proof alcohol and water, which are supplied at low cost, when used in the liquid fuel greatly decrease the ultimate cost of production of the fuel, while the use of high proof alcohol yet retains the cost of production comparatively lower than many other fuels.

The ingredient naphthalene used in the fuel especially adapts the fuel for heavy duty work as in tractors, automotive trucks, stationary internal combustion engines, &c., and the oxygen added to the other component parts and blended therewith in the form of ozone or hydrogen peroxide furnish an additional power which is manifested in the fuel explosion in the same manner that steam lugs under a heavy load.

It is to be understood that the above indicated ingredients can be mixed in various desirable proportions best adapted for different kinds of heavy work, and that the proportions of the various ingredients may be changed and arranged so that the fuel will have a wide range of combustion to suit different conditions.

By using water in the fuel, the water is converted into steam in the cylinder of the engine thus adding expansive force to the fuel. It is desirable that a sufficient quantity of water be present at each explosion of the motor and this may be governed in regulated quantities to secure the steam expansion for increased power.

In addition to its use per se as a liquid fuel, the mixture of my formula may be added to gasoline and blended therewith for excellent results in the combustion chamber of the motor. For instance a pint of the above set forth mixture added to say ten gallons of gasoline will be sufficient for ordinary purposes, but this quantity or proportion may be varied to secure different desired results.

When mixed with gasoline I find that the presence of the blended mixture raises the volatility and flash point of low grade gasoline to a higher degree, increases the explosive power of the gasoline as a fuel, and thus increases the mileage when used in an automotive vehicle. This enhancement of the value of the gasoline as a fuel is secured with a corresponding reduction in heat generated in the engine, thus permitting the engine or motor to run under more favorable conditions and with greater efficiency.

I have found by actual and extended practice that by mixing my solution with gasoline as a fuel the dangers from the existence of carbon monoxide gas are entirely eliminated from the exhaust gases. By this treatment of the gasoline the effect of the carbon monoxide gas is neutralized and rendered harmless, and an engine of any size can be operated with such a fuel in a closed building with perfect safety.

Having thus fully described my invention what I claim as new and desire to secure by Letters Patent is—

A liquid fuel solution comprising—

|  | Per cent. |
|---|---|
| Alcohol and water | 72 |
| Benzol | 18 |
| Ethyl ether | 5 |
| Napthalene | 2.50 |
| Oxygen | 1.50 |
| Sodium hydroxide | 1.00 |

In testimony whereof I affix my signature.

ELMER H. RECORDS.